United States Patent [19]

Iwatsuki

[11] Patent Number: 4,547,558
[45] Date of Patent: Oct. 15, 1985

[54] FLUOROACRYLIC COPOLYMER

[75] Inventor: Shouji Iwatsuki, Aichi, Japan

[73] Assignee: Daikin Kogyo Company Limited, Osaka, Japan

[21] Appl. No.: 583,673

[22] Filed: Feb. 27, 1984

[30] Foreign Application Priority Data

Mar. 7, 1983 [JP] Japan ................................. 58-37859

[51] Int. Cl.$^4$ ........................................... C08F 214/18
[52] U.S. Cl. .................................................. 526/245
[58] Field of Search ........................................ 526/245

[56] References Cited

U.S. PATENT DOCUMENTS 3,386,977  6/1968  Kleiner ................................. 526/245
3,457,247  7/1969  Katsushima et al. ............... 526/245
3,950,315  4/1976  Cleaver ................................ 526/245
4,013,627  3/1977  Temple ................................ 526/245

Primary Examiner—Harry Wong, Jr.
Attorney, Agent, or Firm—Murray, Whisenhunt and Ferguson

[57] ABSTRACT

A copolymer of an acrylic acid derivative and an other copolymerizable monomer, the acrylic acid derivative being a compound represented by the formula (1)

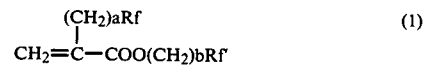

wherein Rf and Rf' are respectively perfluoroalkyl group having 3 to 21 carbon atoms, a is an integer of 2 to 10, b is an integer of 1 to 10.

3 Claims, No Drawings

FLUOROACRYLIC COPOLYMER

The invention relates to a novel fluoroacrylic copolymer.

The present invention provides a copolymer of an acrylic acid derivative and an other copolymerizable monomer, the acrylic acid derivative being a compound represented by the formula (1)

wherein Rf and Rf' are respectively perfluoroalkyl group having 3 to 21 carbon atoms, a is an integer of 2 to 10, b is an integer of 1 to 10.

The acrylic acid derivative (1), one of the starting materials, is a novel compound and is prepared, for example, as follows:

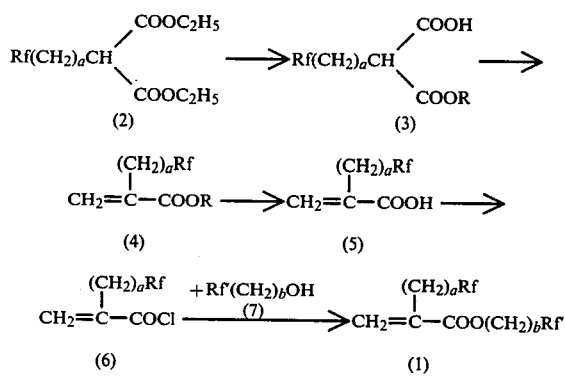

wherein Rf, Rf', a and b are same as above, R is alkyl group having 1 to 10 carbon atoms.

In the above, diethyl 2-fluoroalkylmalonate (2) is hydrolysed in an alkanol with an alkali such as sodium hydroxide and potassium hydroxide and then nutralized with an acid such as hydrochloric acid to obtain a monoalkyl 2-fluoroalkylmalonate (3). The malonate (3) is reacted with formaldehyde in the presence of an amine catalyst to prepare an alkyl α-fluoroalkylacrylate (4). The ester (4) is then subjected to hydrolysis with an alkali such as sodium hydroxide and nutralized with an acid such as hydrochloric acid to obtain α-fluoroalkylacrylic acid (5). The acid (5) is converted to an acid chloride (6) with a chlorinating agent and then reacted with a fluoroalcohol (7) to give a desired acrylic acid derivative (1).

The acrylic acid derivative (1) can also be prepared by following steps.

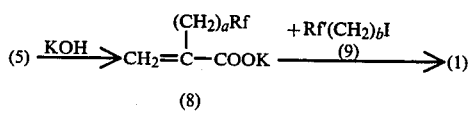

α-fluoroalkylacrylic acid (5) is reacted with KOH in a solvent mixture of ethanol and water to obtain its potassium salt (8) which is reacted with fluoroalkyl iodide (9) to give the acrylic acid derivative (1).

2-Diethyl fluoroalkylmalonate (2) is prepared by reacting 2-(perfluoroalkyl)alkyl bromide (or iodide) with diethyl malonate and sodium hydride. Further, synthesis of compound (5) from compound (2) is described in detail in Japanese patent application No. 82,387/1981 filed by the present applicant.

According to the invention, other copolymerizable monomers are selected from various compounds. Examples thereof are ethylene, isoprene, chloroprene, styrene and like olefins, butadiene and like diolefins, vinyl acetate and like vinyl esters, vinylidene chloride and like vinylidene halogenide, acrylic acid, methacrylic acid, maleic anhydride and like acids, ethyl acrylate, butyl acrylate, methyl methacrylate, ethyl methacrylate, benzyl methacrylate, cyclohexyl methacrylate, 2-hydroxy-3-chloropropyl acrylate, 2-hydroxy-3-chloropropyl methacrylate and like acrylates and methacrylates, vinyl methyl ketone and like vinyl alkyl ketones, vinyl isopropyl ether and like vinyl alkyl ether, etc. Among these, preferable are acrylic acid, methacrylic acid and their alkyl esters, and particularly preferable are acrylic compounds represented by the formula

wherein $R^1$ is hydrogen or methyl group, $R^2$ is hydrogen or alkyl group having 1 to 18 carbon atoms.

The content of the acrylic acid derivative (1) in the copolymer of the invention can be varied in a wide range. Preferably it is about 0.01 to 10 mole%, more preferably about 0.1 to 5 mole%.

The copolymer of the invention is prepared by copolymerization, which can be conducted by various kinds of polymerization, for example, by bulk polymerization, solution polymerization, suspension polymerization, emulsion polymerization, radiation polymerization, photo polymerization, plasma polymerization, etc. As a polymerization initiator can be used a compound which produce free radicals under the reaction condition, anionic initiator, etc. Examples of preferable initiators are peroxides such as diisopropyl peroxydicarbonate, ammonium persulfate, azonitriles such as azobisisobutyronitrile, anionic initiator such as sodium alkoxide, sodium amide, etc. The amount of the initiator to be used is not limited and is usually 1 to 1000 ppm (weight) based on the monomers, depending on the polymerization degree, reaction time, polymerization temperature and the like. The polymerization temperature is usually in the range of −80° to 250° C., preferably 40° to 150° C. depending on the decomposition temperature of the initiator. The polymerization pressure is not particularly limited. In the solution polymerization can be used a solvent, for example, fluorohydrocarbons such as 1,3-ditrifluoromethylbenzene, chlorofluoroalkanes such as trichlorofluoroethane, chlorohydrocarbons such as methyl chloroform, carbon tetrachloride, chloroform, perchloroethylene, trichloroethylene, etc. The polymerization may be carried out under the spontaneous pressure depending on the monomers, solvent, polymerization temperature, etc.

The present copolymer can be recovered by a conventional methods. For example, the present copolymer is dissolved in a good solvent such as trichlorotrifluoroethane and thereto is added methanol or like poor solvent to precipitate the copolymer.

The present copolymer has a low critical surface tension and is useful as a water repellent, oil repellent, stain-proofing agent, etc.

The invention will be described in detail with reference to Examples and Reference Examples.

REFERENCE EXAMPLE 1

To 6.0 g (10.6 mmole) of $CH_2=C(COOH)CH_2CH_2(CF_2)_6CF(CF_3)_2$ were added 17 ml (234 mmole) of thionyl chloride and 3 drops of N,N-dimethylformamide. After the mixture was refluxed for 5 hours, thionyl chloride was removed by distillation. Further, thionyl chloride was removed sufficiently by treating the mixture at a reduced pressure at room temperature with use of a glass tube containing NaOH. The acid chloride (6) was obtained by distillation under a reduced pressure. Yield: 4.50 g (72.4%), boiling point: 70°–88° C./0.07–0.6 mmHg.

To 4.50 g (7.67 mmole) of the above acid chloride (6) were added 15 ml of pyridine and 3.56 g (7.67 mmole) of $C_8F_{17}CH_2CH_2OH$ (7) and the mixture was stirred over night at room temperature. To the reaction mixture was added a saturated aqueous solution of sodium chloride and the mixture was extracted with isopropyl ether (IPE). The extract was washed with saturated aqueous solution of sodium chloride, diluted aqueous solution of hydrochloric acid and again with saturated aqueous solution of sodium chloride and then dried with use of $MgSO_4$. After the drier was filtered off, IPE was distilled off under a reduced pressure to obtain a crystal. The crystal was subjected to recrystallization repeatedly, giving 1.64 g (yield 21.2%) of the desired acrylic acid derivative (hereinafter referred to as "Compound A") having the formula below.

White crystal, melting point: 39.5°–40.0° C.

| Elementary analysis: ($C_{24}H_{10}O_2F_{36}$) | | |
|---|---|---|
| | C | H |
| Calcd (%) | 28.42 | 0.99 |
| Found (%) | 28.33 | 0.94 |

$$CH_2=C \begin{matrix} CH_2CH_2(CF_2)_6CF(CF_3)_2 \\ COOCH_2CH_2C_8H_{17} \end{matrix}$$

REFERENCE EXAMPLE 2

Into a mixture of 10 ml of ethanol and 5 ml of water was dissolved 1 g (1.76 mmole) of $CH_2=C(COOH)CH_2CH_2(CF_2)_6CF(CF_3)_2$. Thereto was added dropwise a solution of 0.12 g (1.76 mmole) of potassium hydroxide (85%) in 10 ml of ethanol to adjust its pH to neutral. After removing solvent by freeze-drying, anhydrous benzene was added to the mixture. The mixture was subjected to azeotropic distillation with use of a water-separating funnel to remove water. A yellow brown crystal of the potassium salt (8) was obtained in a yield of 0.93 g (1.53 mmole) by removing benzene and drying at a reduced pressure.

To the potassium salt (8) were added 15 ml of hexanol, 0.95 g (1.53 mmole) of $(CF_3)_2CF(CF_2)_6CH_2CH_2I$ (9) and p-tert-butylcatechol as a polymerization inhibitor, and the mixture was refluxed for 25 hours. The reaction mixture was filtered and washed with IPE. Crystals were precipitated by removing some part of IPE under a reduced pressure, followed by cooling. The crystals were filtered with suction and recrystallized with n-hexane to give 0.37 g (yield 19.8%) of a desired acrylic acid derivative (hereinafter referred to as "Compound B") having the formula below.

White crystal, melting point: 46.5°–48.0° C.

| Elementary analysis: ($C_{25}H_{10}O_2F_{38}$) | | |
|---|---|---|
| | C | H |
| Calcd (%) | 28.21 | 0.95 |
| Found (%) | 28.59 | 0.89 |

$$CH_2=C \begin{matrix} CH_2CH_2(CF_2)_6CF(CF_3)_2 \\ COOCH_2CH_2(CF_2)_6CF(CF_3)_2 \end{matrix}$$

EXAMPLES 1 AND 2

To an ampoule were added Compound A and methyl methacrylate(MMA) in the proportions listed in Table 1 and 0.3 mole% of azobisisobutyronitrile(AIBN) as a polymerization initiator. The mixture was solidified with liquid nitrogen, the air in the ampoule was expelled through a vacuum pump, the ampoule was shut off and the mixture was melted. The above procedure of solidifying, expelling, shutting off and melting was repeated three times to remove air sufficiently and then the ampoule was sealed under vacuum after solidifying the mixture. The ampoule was placed at 60° C. in a thermostat for the prescribed time to perform a polymerization. The resultant copolymer was dissolved in chloroform. The solution was poured into methanol to form precipitates. The precipitates were purified with reprecipitations and dried under a reduced pressure. The copolymer was then weighed to determine the conversion. The composition of the copolymer was determined by an elementary analysis and the viscosity [$\eta sp/c$ (dl/g)] was measured in chloroform at 30° C. The results were given in Table 1.

EXAMPLES 3 TO 4

A solution polymerization of monomers listed in Table 1 was conducted with use of 3.5 mg of AIBN in 5 ml of 1,3-ditrifluoromethylbenzene at 60° C. The results were shown in Table 1.

EXAMPLES 5 TO 8

A procedure was repeated in the same manner as in Example 1 with the exception of enhancing the conversion. The results were shown in Table 1.

The critical surface tension ($\gamma c$) of each copolymer was determined from the contact angle ($\theta$) of its solution in several kinds of liquids (n-heptane, n-octane, n-decane, n-dodecane and n-tetradecane). The values of $\cos \theta$ were ploted against the surface tension ($\gamma$) of each liquid and the critical surface tension ($\gamma c$) was determined by finding the surface tension ($\gamma$) which corresponds to the point at which $\cos \theta$ is 1. For comparison, Table 1 also showed $\gamma c$ of a copolymer of ethyl α-fluoroalkylacrylate and MMA, having an equal fluorine content.

EXAMPLE 9

A solution polymerization was conducted in the same manner as in Example 3 with the exception of enhancing the conversion. The results were given in Table 1.

TABLE 1

| | MONOMERS | | | | | | polym. time (min) | yield (mg) | convn. (%) | COPOLYMER | | | | | Comprsn |
|---|---|---|---|---|---|---|---|---|---|---|---|---|---|---|---|
| | Compound A | | | | MMA | | | | | Composition | | | η sp/c (dl/g) | γ c | γ c (dyn/cm) |
| | mg | mmole | mole % | F(wt %) | mg | mmole | | | | C (%) | compd. A (mole %) | F (wt %) | | | |
| Ex. 1 | 13.4 | 0.01 | 0.13 | 0.9 | 979.7 | 9.8 | 38 | 64.8 | 6.5 | 58.2 | 0.60 | 3.86 | 1.75 | — | — |
| Ex. 2 | 42.3 | 0.04 | 0.44 | 2.8 | 953.1 | 9.5 | 38 | 64.9 | 6.5 | 57.2 | 0.94 | 5.91 | 1.67 | — | — |
| Ex. 3 | 76.9 | 0.08 | 1.73 | 10.2 | 429.5 | 4.3 | 82 | 30.7 | 6.0 | 54.4 | 2.10 | 12.03 | — | — | — |
| Ex. 4 | 220.7 | 0.22 | 7.33 | 29.8 | 273.4 | 2.7 | 120 | 25.7 | 5.2 | 54.7 | 1.95 | 11.33 | — | — | — |
| Ex. 5 | 9.4 | 0.01 | 0.07 | 0.45 | 1389.3 | 13.9 | 840 | 1280.0 | 91.0 | 59.2 | 0.25 | 1.7 | 3.82 | 19.5 | 22.7 |
| Ex. 6 | 20.4 | 0.02 | 0.14 | 0.95 | 1416.0 | 14.1 | 840 | 1279.8 | 88.7 | 59.1 | 0.27 | 1.8 | 2.93 | 18.4 | — |
| Ex. 7 | 63.3 | 0.06 | 0.46 | 3.01 | 1346.7 | 13.5 | 840 | 1104.8 | 78.0 | 58.7 | 0.42 | 2.7 | 6.56 | 18.0 | — |
| Ex. 8 | 103.7 | 0.10 | 0.78 | 4.94 | 1304.0 | 13.0 | 840 | 1164.6 | 82.4 | 58.1 | 0.62 | 4.0 | 6.47 | 14.8 | 20.0 |
| Ex. 9 | 392.6 | 0.39 | 3.69 | 18.81 | 1006.5 | 10.1 | 960 | 810.5 | 57.6 | 54.8 | 1.89 | 11.0 | 0.63 | 12.3 | 16.8 |

I claim:

1. A fluoroacrylic copolymer comprising an acrylic acid derivative of the formula $$CH_2=C-COO(CH_2)bRf' \atop |(CH_2)aRf} \quad (1)$$

wherein Rf and Rf', which may be the same or different, are each a perfluoroalkyl group of 3 to 21 carbon atoms, a is an integer of 2 to 10 and b is an integer of 1 to 10, and a copolymerizable monomer selected from the group consisting of acrylic acid, methacrylic acid, maleic anhydride, olefins, vinyl esters, vinylidene halogenides, acrylates, methacrylates, vinyl alkyl ketones and vinyl alkyl ethers, wherein the content of the acrylic acid derivative in the copolymer is about 0.01 to 10 mole percent.

2. Copolymer of claim 1, wherein said copolymerizable monomer is of the formula $$CH_2=C(R^1)COOR^2$$

wherein $R^1$ is hydrogen or a methyl group and $R^2$ is hydrogen or an alkyl group of 1 to 18 carbon atoms.

3. Copolymer of claim 1, wherein the amount of said acrylic acid derivative in the copolymer is about 0.1 to 5 mole percent.

* * * * *